United States Patent [19]
Conner et al.

[11] Patent Number: 5,536,898
[45] Date of Patent: Jul. 16, 1996

[54] COMPOSITION AND METHOD FOR IMMOBILIZING ORGANIC COMPOUNDS IN HAZARDOUS WASTES AND SOILS

[75] Inventors: Jesse R. Conner, Pittsburgh, Pa.; Fernley G. Smith, Port Clinton, Ohio

[73] Assignee: Environmental Technologies Alternatives, Inc., Port Clinton, Ohio

[21] Appl. No.: 330,835

[22] Filed: Oct. 27, 1994

[51] Int. Cl.$^6$ ..................................................... B09B 3/00
[52] U.S. Cl. ........................... 588/252; 588/249; 588/901
[58] Field of Search ..................................... 588/249, 252, 588/901; 106/697; 210/751; 405/128, 129

[56] References Cited

U.S. PATENT DOCUMENTS

| | | |
|---|---|---|
| 2,333,142 | 11/1943 | Behrman . |
| 3,567,660 | 3/1971 | Winkler . |
| 4,182,677 | 1/1980 | Bocard et al. . |
| 4,460,292 | 7/1984 | Durham et al. ........................... 405/129 |
| 4,615,809 | 10/1986 | King ..................................... 405/129 X |
| 4,687,373 | 8/1987 | Falk et al. ................................ 405/128 |
| 4,728,343 | 3/1988 | Snyder . |
| 4,770,715 | 9/1988 | Mandel et al. ....................... 588/252 X |
| 4,952,242 | 8/1990 | Earp ..................................... 405/128 X |
| 5,078,795 | 1/1992 | Conner et al. ........................... 106/624 |
| 5,242,598 | 9/1993 | Shannon et al. ..................... 405/128 X |

*Primary Examiner*—George A. Suchfield
*Attorney, Agent, or Firm*—Sidney W. Millard

[57] ABSTRACT

The organic chemical waste content of contaminated materials such as soils and debris is immobilized by mixing such wastes with an agent consisting of a mixture of particulate rubber and biogenic amorphous silica. Where the semi-volatile content of the waste is known to predominate a greater portion of particulate rubber is advantageous and where such waste is known to be entirely semi-volatile organic material such agent advantageously consists essentially or comprises particulate rubber. Conversely, where the organic content of such wastes is predominately volatile organic material a greater portion of biogenic amorphous silica should be employed and where such organic waste is known to be entirely volatile organic such additive is advantageously biogenic amorphous silica.

8 Claims, No Drawings

COMPOSITION AND METHOD FOR IMMOBILIZING ORGANIC COMPOUNDS IN HAZARDOUS WASTES AND SOILS

FIELD OF THE INVENTION

This invention relates to a method and composition for immobilizing hazardous organic constituents in waste materials and soils.

BACKGROUND OF THE INVENTION

The stabilization of metals in hazardous wastes has been done at remedial operations and at fixed treatment sites for more than 20 years in the U.S. It is an accepted method of treatment, specified in 22% of the 1990 Superfund Records of Decision (ROD)[1] and as Best Demonstrated Available Technology (BDAT) for 44 EPA listed wastes under the Land Disposal Restrictions (LDR)[1]. Commercial waste treatment companies have been running stabilization operations for metals at their RCRA Treatment, Storage and Disposal Facilities (TSDF) since 1985, treating literally thousands of different waste streams. The immobilization (or stabilization, chemical fixation, etc.) of organic constituents in wastes, although more recent, has been shown in numerous studies[23] to be capable of considerably reducing the mobility of these hazardous contaminants as measured by the Toxicity Characteristic Leaching Procedure (TCLP)[4] The TCLP has been the standard regulatory leaching test used in the United States for many years. Immobilization of low levels of hazardous organic compounds in soils, sludges, debris and other wastes has received increasing regulatory attention of late. In addition to several older guidelines under "Superfund" (CERCLA), two recent final regulations under the Resource Conservation and Recovery Act (RCRA) mandate treatment of all hazardous organics contained in "contaminated debris" and of 26 compounds contained in other wastes.

Under CERCLA, a variance procedure in remedial actions allows immobilization of organics as an alternative to removal or destruction[5], and a draft guidance document from EPA Risk Reduction Engineering Laboratory (RREL)[6] that recommends total constituent analysis be used as a means of judging the success of immobilization. Under RCRA, the 1992 "debris rule",[7] and the new rule dealing with EPA Waste Codes D018–D043 ("Characteristic" or "D-Code" wastes)[8] require the treatment of hazardous constituents in debris and other wastes. Most importantly, now two different test methods are used to judge the effectiveness of the treatment in meeting the regulatory requirements: the Toxic Characteristic Leaching Procedure (TCLP) and Total Constituent Analysis (TCA). TCA has replaced TCLP in the case of organics for most purposes under RCRA, and is recommended[6] as the primary test in CERCLA and other remedial actions. It is also the basis for EPA's Universal Treatment Standards (UTS)[9] TCLP is used in the case of debris[7] and as an additional test in remedial work.

Due to the test procedures, meeting the present and forthcoming TCA standards for organics is much more difficult than passing the TCLP test. Previously, the use of reagents such as activated carbon in stabilization systems to immobilize organic constituents was based on the TCLP test method. However, with the TCA test method, such reagents are often not very effective. In the TCLP test, a dilute aqueous solution of acetic acid or buffered acetic acid at pH 2.88 or 4.93, respectively, is used depending on the alkalinity of the waste sample to be tested. The extraction solution to sample ratio is 20:1 by weight, and the waste particle size is less than 9.5 mm. The waste and extraction solution are mixed together and agitated for a period of 18 hours, after which the mixture is filtered and the filtrate analyzed for constituents of concern by standard EPA methods[10]. The purpose of the test is to determine to what extent a contaminant will leach from a waste under what EPA called an "improperly managed" disposal scenario, i.e., a reasonable worst case condition in a co-disposal landfill. The amount leached will depend on the properties of the constituent, waste form properties and test factors: solubility, diffusion through the matrix, particle size, etc. Stabilization processes have historically been designed to resist the leaching effect of tests such as this.

The TCA test, strictly speaking, is not a performance test but an assay procedure. In other words, it was intended to be used to measure the total amount of a constituent in the waste, not its mobility. In the case of metals in a solid sample, the sample is completely dissolved, or "digested," in various strong acids so that all constituents go into solution and can then be analyzed. The test result accurately reflects the total amount of metal present in the original sample. In the case of organics, however, the metal digestion method cannot be used because many compounds would be destroyed or altered by the procedure itself. Nevertheless, it is necessary to get the organic out of the solid and into solution so that it can be analyzed for. This is done by means of extractions with one or more powerful solvents that are presumed to dissolve out essentially all of the organic from the solid phase matrix. However, it is a fact that any multi-phase extraction process will partition the constituent being extracted according to the relative affinity of the constituent for the respective phases. This is expressed as a partition coefficient (amount in the liquid phase divided by the amount in the solid phase, after extraction), a term quite familiar in the chemical process industries. For analytical purposes, the partition coefficient must be very high. If the organic constituent was found at significantly lower concentrations, or not detected at all in the TCA test, it was assumed that it had either been volatilized, destroyed, or converted into another species, most likely volatilized. This is probably the basis for EPA's opinion that stabilization is not appropriate for many organics, since they were assumed to have been driven off during the mixing action in stabilization and/or by the heat generated in the chemical reactions.

Before EPA arrived at its new stance in using TCA instead of TCLP for measuring hazardous organic constituents, a testing program was conducted[11] on the stabilization of organics using the TCLP test. In testing various reagents in a cement-based stabilization system for their ability to immobilize organics as measured by the TCLP test[3], we also measured TCA before and after treatment to establish a materials balance—to determine whether the organic constituent was retained in the treated matrix, and not volatilized. Unexpectedly, it has been found that the rubber particulate not only immobilized the organics, but that in the majority of cases the semi-volatile organics (SVOCs) were no longer detectable[1] by the TCA test in the treated, solid, waste mixture itself. VOCs, on the other hand were not reduced in concentration in most cases by rubber particulate alone, with only several of the compounds tested being substantially reduced in concentration. Furthermore, it was found that rice hull ash (RHA), which was not effective in TCA reduction with SVOCs, was very effective with VOCs; the majority of the constituents tested showed substantial TCA reductions. Together, rubber particulate and rice hull ash were capable of substantial TCA reduction for about 80% of the compounds tested. In comparison, and as was originally expected, organics in the samples treated by cement alone, cement plus activated carbon or cement plus organically-modified clay were not substantially reduced— less than 25% effectiveness in either case. $\neq^1$ Detection levels vary for different compounds in different matrices, but are generally in the range of 0.1 to 10 mg/kg (ppm)

The exact mechanism for this phenomenon is not known at this time. We do know, however, by the way in which the experiments were conducted, that the organics were not vaporized or otherwise lost to the environment. The organics may have been chemically modified, or bonded in some way to the rubber so that they could not be separated by the analytical procedure. Scientists have hypothesized that such immobilization may involve some sort of chemical bonding or even conversation of the constituent into another compound. The heat of adsorption, $\Delta H_{ad}$, is a measure of the binding energy between the substrate and an adsorbate[12]. When $\Delta H_{ad}$ is $\leq$~15 kcal/mol, a weakly adsorbing species, it is known as physisorption; when $\Delta H_{ad}$ is $\leq$~15 kcal/mol, a strongly adsorbing species, the bond is more chemical-like and is termed chemisorption. However, this is a continuum, not a sharp dividing line. Certainly, more than simple, reversible surface adsorption is involved. Vendors of organo-clays have claimed for years, with some support from others, that chemical reactions and/or chemisorption are taking place on the active, interior surfaces of reagent particles. This may explain the ability of micro-porous materials like rubber particulate and RHA to achieve immobilization as determined by the TCA test.

In any case, by EPA definition the organics are not longer present or are not present in sufficient quantity to pose a hazard to human health and the environment. We are not aware of any known properties of rubber or rice hull ash that account for this discovery, nor is it disclosed or suggested in any known environmental or technical literature. In addition to their vastly superior ability to destroy or bond organics, ground rubber and RHA cost only one-third to one-half as much as activated carbon, and like carbon, are not biodegraded so that they are stable when landfilled. This is not necessarily true of organically-modified clays or many other organic sorbents. The stability of rubber in landfills is well proven and documented. RHA is mostly amorphous silica, and is known to be non-biodegradable.

The test method prescribed by the new regulations and guidances has significantly, suddenly and unexpectedly changed the whole stabilization picture for organics. Assumptions made on the basis of many years of using activated carbon and other carbonaceous sorbents in the treatment of air emissions and water are not valid in this situation. When the TCLP test was used to test for immobilization, carbon was the most generally effective commercial reagent. With the TCA test, carbon is ineffective for most compounds, even for VOCs where it most stood out in the TCLP testing. Reductions in TCA using the process of the present invention ranged up to 99.9%, with some reduction in all cases. Reductions in TCLP leachability ranged from a minimum of 90% to better than 99%. Now, immobilization of low-level organics in soils, sludges and debris is feasible.

The use of shredded or particulate rubber and the like for physically absorbing organic solvent and fuels is well known. U.S. Pat No. 4,182,677 (Bocard et al, Jan. 8, 1980) relates to a process for absorbing hydrocarbons or organic solvents, particularly in solution or suspension in water at low concentration, by means of an absorption mass consisting of rubber particles of from 0.1 to 3. mm, subjected to a treatment with an organic or inorganic acid or an aqueous solution or emulsion thereof. U.S. Pat No. 3,567,660 (Winkler, Mar. 1971) relates to a process for converting oil spills into a useful material, using rubber and asphaltic material. U.S. Pat. No. 2,333,142 (Behrman, Nov. 2, 1943) relates to a water softening process using sulfonated rubber particulate for an ion exchange material. U.S. Pat. No. 4,728,343 (Snyder, Mar. 1, 1988) relates to a method of substantially precluding the accumulation of combustible organic vapors in a storage container by placing comminuted vulcanized rubber as an absorbing medium in contact with the vapors.

The use of rice hull ash as an absorbent for hazardous wastes is also well known. U.S Pat. No. 4,460,292 (Durham, Jul. 1984) describes the burning of biogenetic materials such as rice hulls to produce amorphous, biogeneric silica, rice hull ash, and its use as a physical absorbent for hazardous wastes. U.S. Pat. No. 5,078,795 (Conner et al, Jan. 7, 1992) discloses the solidification and chemical fixation of wastes using rice hull ash and an alkali and a polyvalent metal ion to provide a cementitious product of the waste.

For the purposes of the present application the terms volatile organic chemicals or materials (VOC) and semi-volatile chemicals or materials (SVOC) are distinguished by the EPA's classification which is set forth in reference 8 below. Such regulation includes a complete listing of hazardous and regulated organics subject to the regulation and for which the method of the present invention is applicable. Such regulations and listing are hereby included in this specification by reference. Additions to such listings made hereafter are also included.

SUMMARY OF THE INVENTION

As set forth above, particulate rubber and biogenetic amorphous silica have long been used as absorbents of liquids in the treatment of hazardous wastes. For example in the process of U.S. Pat. No. 4,182,677, emulsions of liquid hydrocarbons or organic solvents in water are absorbed by treated particulate rubber and in the process of U.S. Pat. No. 4,460,292 biogeneric amorphous silica is used to lower the water content of liquid hazardous waste by absorbing water, however such materials are not known for applications to contaminated soils or solid waste materials.

It has now been discovered that the blending or mixing of untreated particulate rubber and biogeneric amorphous silica with soils and solid hazardous wastes that are contaminated with hazardous organic compounds immobilize such compounds (i.e. they are no longer reactive) to such an extent they will pass EPA requirements in respect to such organic materials relative to the treatment of hazardous constituents in debris and other wastes (i.e. the TCLP and TCA test described above).

This discovery is surprising because such soils contain only the normal moisture content for soil which is generally no greater than about 10%, by weight (although occasionally can be as high as 50% depending on rainfall, ground water ,etc), so that such immobilization cannot be attributed to absorption.

Where the hazardous organic materials are known to be predominately semi-volatile (SVOCs such as defined in reference 8 of this specification), it is advantageous to employ greater proportions of rubber particulate than biogenetic amorphous silica or 100% rubber particulate where all or substantially all of such organics are semivolatile (i.e. SVOC) materials. Conversely, where the hazardous organic content is known to be predominately or substantially all volatile (VOC) proportionally greater proportions of biogeneric amorphous silica are desirable. Particularly desirable results are achieved with a mixture of these two constituents in substantially equivalent amounts.

As set forth elsewhere in this specification other constituents may be mixed with or added to a soil, waste or sludge treatment with the particulate rubber and biogeneric amorphous silica. Such other additions may be cements, activated carbon etc. any of which may have other advantageous effects.

The additions of particulate rubber or/and biogenetic amorphous silica to soils, sludge and wastes in accordance with the present invention in any amount (i.e. as little as 0.01%, by wt. of the mixture) will have some advantageous effect in immobilizing some of the hazardous organic materials present. Additions in amounts in excess of 150%, by wt. of waste being treated are considered wasteful. A practical narrower range of addition would be about 0.5% to 50%, by weight.

Particulate rubber of any size will have some advantageous effect in immobilizing hazardous organics. It has been found that a particle sizes of from about ¼ cubic inch to about 200 mesh are effective. Particles of a size distributions set forth in Table I wherein at least 40% will pass through a 50 mesh screen are preferred.

The method of the present invention is particularly applicable to particulate materials such as organic waste contaminated soils but is also useful for the treatment of debris (hazardous debris or contaminated debris) as such term is defined in EPA classifications. The term debris includes large solid material such as rocks, metal, wood, cloth, paper, vegetative matter, etc. that is contaminated either on the surface or in the interior (where porous). Other particulate materials of environmental concern to which the present invention applies include sludges, powders, dusts, etc.

The method of the present invention is particularly useful for the treatment of contaminated soils and solid wastes in the presence or absence of water or other liquids. The presence (or absence) of the normal water content of soils (i.e. 5–10%, by weight) has little or no affect on the immobilizing effect of additions of particulate rubber, biogeneric amorphous silica or mixtures thereof. Additions of these materials to solid contaminated wastes of much higher water content are also effective. So long as the additions contact and/or mix with the contaminated soil particles or solid wastes immobilization of the organics will occur. Particulate rubber is essentially hydrophilic and a non absorbent of aqueous liquids, hence it must be treated before it will act as an absorbent to remove organic emulsions from water in the manner of U.S. Pat. No. 4,182,677. In the present application the particulate rubber is untreated and consequently may be freely mixed with water to immobilize hazardous organic contaminated soil or solid wastes in such water. Additions of biogenetic amorphous silica may be made to high water content solid materials in quantities to overcome its hydrophobic nature. So long as some of the amorphous silica contacts the solid hazardous waste at least some immobilization of hazardous organic materials will occur. As a consequence the additions of the present invention may be made for the immobilization of organic compounds in or on particulate and solid waste waters, sludges, slurries, powders, dusts, soils, etc.

DETAILED DESCRIPTION OF THE INVENTION

Rubber Particulate

The rubber particles having utility in this invention are obtained by cutting new or waste rubber to bits. The bits are prepared by processing new or waste rubber through mechanical crushers, ambient grinders and granulators including cryogenic freezing to achieve the various particle sizes desired, with the proviso that the rubber does not come in contact with an oil or any liquid miscible with oil that would cause the rubber to swell during the processing of the granulated rubber particles.

The starting material rubber may be scrap rubber such as from tires. Tires can be made from various elastomers known to the art which in itself is made from polymers generally containing unsaturated sites therein. In effect, they are made from various elastomer forming monomers. One such class of monomers are the various conjugated dienes having from 4 to 12 carbon atoms. Specific examples of diene monomers include butadiene, isoprene, pentadiene, hexadiene, heptadiene, octadiene, 2,3-dimethyl-1,3-butadiene, 2-methyl-1,3-pentadiene, and the like. Preferred conjugated elastomers are made from monomers of butadiene and/or isoprene. Moreover, natural rubber can be utilized. By the term "natural rubber," it is meant the elastomeric substance obtained from various trees and plants which generally grow in the tropics or desert portions of the world. Such material contains a very high content (in excess of 90 percent and often in excess of 95 percent) of cis-1,4-polyisoprene. Also included within the class of conjugated dienes are the various copolymers and interpolymers thereof (e.g., polybutadiene-isoprene), including the various diblock copolymers, triblock copolymers (e.g., polystyrene-butadienestyrene), and the like.

Another group of useful elastomers include the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alpha-methylstyrene, 4-t-butylstyrene, vinyl toluene, divinyl benzene, isopropenyl benzene, diisopropenyl benzene, and the like. Examples of specific copolymers thus include polystyrene-butadiene (SBR), poly-alpha-methyl-styrene-butadiene, and poly-4-t-butylstyrene-butadiene. A preferred copolymer is a polystyrene-butadiene.

The granular rubber particles of this invention have a particle size of from about 1 cubic inch to about 200 mesh (0.075 mm).

The description below outlines how the granular rubber particles are made. The tires or scrap rubber are passed through a corrugated cracker mill where the tires are crushed and torn into large chunks, or as an alternative fed through a shredder for similar first stage sizing. At this point, the chunks vary in size between 4–10 square inches. The obtained chunks are then fed through a second corrugated cracker mill or hammer mill where the chunks are further ground, sheared and pounded until the rubber is free from the metal. During this stage, magnetic separators remove metal and the chunks are continuously screened to allow the smaller pieces (less than ½") to proceed through the process while the larger pieces stay within the hammer mill for subsequent size reduction. The less than ½" rubber pieces are then sent to a fine grinding mill where they are crushed and sheared into small particles between about 0 and 50 mesh. During this stage, the cord has been liberated, becomes fluffy and is separated from the granular rubber particles by air tables designed to float off less dense materials. At the same time separation tables are pre-grading the sizes of granular rubber particles and removing any metal still mixed in with the granular rubber particles.

Throughout all stages of processing it is essential to utilize air movement techniques to minimize heat buildup of the material. This is due to the fact that the energy required to mechanically destruct the tires generates heat at the first stage of cracking or shredding. A waterfog is utilized to aid in cooling the material. In later stages air movement further aids in cooling the material. Temperatures of from about 100° to 180° F. are common throughout the process with temperatures in the final stage from about 60° to 75° F. To obtain granular rubber particles at from about 40 to 200 mesh, a cryogenic process is utilized. Within this process rubber of from about ¼" to ½" in size is cooled to about -300° F. using liquid nitrogen. The rubber is pulverized in a specially designed hammer mill and screened for final sizing.

The above grinding procedures do not give a rubber particle of one particular mesh, but rather a mixture of various meshes. Depending upon the procedure used, a mixture of rubber particles can be obtained having predominantly a fine mix or predominantly a coarse mix. The sum of percents of the various types add to 100% and they denote the distribution of the various meshes in percent of the three types listed in Table 1; Type 1 is the finest and Type 3 is the coarsest.

TABLE I

| Mesh | Type 1 % | Type 2 % | Type 3 % |
|---|---|---|---|
| 20 | 21.2 | 33.9 | 56.1 |
| 50 | 75.3 | 63.1 | 39.4 |
| 100 | 3.2 | 2.9 | 2.1 |
| 200 | 0.3 | 0.1 | 0.4 |

Mesh, when used in this invention, refers to US standard sieve and thus is based on 99–100% of the material passing through a certain screen (mesh) size. That is, granular rubber particles having 200 mesh means that 99–100% of those particles passes through a screen that has 200 openings per square inch.

It should be noted that the ground rubber can be formulated in nearly any particle size range, and that the above ranges are only examples of several types which have been tested. As will be discussed below, that particle size range can be critical for certain applications where the rubber particles must not be sop fine that it becomes dusty. In other applications, a wide distribution of particle sizes may be preferred.

In addition to its ability to immobilize organics so that they do not leach in disposal environments, rubber particulate substantially reduces the evaporation rate of VOCs so that air pollution is minimized. This property is expected to be of increasing importance when the new EPA air pollution control requirements for treatment units come into effect. The addition of rubber particulate also reduces the flash point of the system, thus providing an additional safety factor in treatment and disposal. Table II illustrates this latter property. The flash points of flammable organic liquids can be raised to well beyond the RCRA definition of ignitability. To illustrate this property, a number of tests were run on various flammable liquids, using different ratios of granular rubber to liquid. All tests were done according to ASTM D93, modified for testing of solids, using the Pensky-Martens Closed Cup Flash Point Tester. According to RCRA, a flash point above 140 F. classifies a material as not hazardous by reason of ignitability. These results are even more impressive than would appear at first glance, because the sorption of volatile liquids on materials such as paper toweling actually increases the volatility over that of the liquid itself. For example, in the case of toluene, the weight loss by evaporation of the liquid sorbed on paper toweling is double that of the liquid alone after 30 minutes.

TABLE II

| Flammable Liquid | Weight % "KAX"* (rubber particulate) | Weight % Liquid | Flash Point |
|---|---|---|---|
| Lamp Oil | 0 | 100 | 158 |
|  | 38 | 62 | >215 |
| Mineral Spirits | 0 | 100 | 104 |
|  | 34 | 66 | 115 |
|  | 50 | 50 | >200 |
| Toluene | 0 | 100 | 45 |
|  | 11 | 89 | 59 |
|  | 45 | 55 | 70 |
|  | 51 | 49 | 90 |
|  | 54 | 46 | 120 |
|  | 56 | 44 | 130 |
|  | 58 | 42 | 140 |
| Xylenes | 0 | 100 | 78 |
|  | 32 | 68 | 88 |
|  | 48 | 52 | 113 |
|  | 65 | 35 | 176 |
| Isopropyl Alcohol | 0 | 100 | 95 |
|  | 56 | 44 | 100 |
|  | 66 | 34 | 110 |
|  | 68 | 32 | >140 |

*Trademark of Environmental Technologies Alternatives, Inc for particulate rubber of the following specifications:

PRODUCT ANALYSIS

| CHEMICAL PROPERTIES | MIN | MAX | ASTM |
|---|---|---|---|
| Acetone Extract | 10.0% | 19.0% | D-297 |
| Ash Content | 6.0 | 12 | |
| Carbon Black | 28.0 | 39 | |
| Moisture Content | .5 | 1 | |
| Rubber Hydrocarbon | 40 | 50 | |

| PHYSICAL PROPERTIES | ASTM |
|---|---|
| Bulk Density - approximately 100 gm/210 cc | D-1511 |
| Specific Gravity - 1.15–1.20 | D-1511 |

| SIEVE ANALYSIS | U.S. Standard Sieve | |
|---|---|---|
|  | MESH SIZE | % PASSING |
|  | 20 | 100% |
|  | 30 | 98 |
|  | 40 | 60 |
|  | 60 | 30 |

Rubber particulate can be mixed in any proportions with cementitious and pozzolanic binders where specific physical properties are required in the final waste form, or where metal stabilization is necessary. It can also be used in conjunction with other reagents. For example, a mixture of rubber particulate and activated carbon may be useful where a wide range of constituents are present or where both TCA and TCLP tests are to be used for evaluation. Rubber particulate will not interfere with the reactions that take place in cementitious systems; however, binders such as cement are not necessary for immobilization of organics by rubber particulate. Other useful properties of rubber particulate in this application include:

Ease of handling, non-dusting, non-caking, and having sufficient specific gravity to "throw" well and fall quickly.

Good storage life, high resistance to degradation by sunlight, oxygen and pollutants in air, and microorganisms.

Non-toxic and non-volatile: will not cause injury to aquatic organisms, animals or humans, even in direct skin contact and do not pose an inhalation hazard.

Hydrophobic, so that the presence of water does not interfere with its ability to immobilize organics.

Alteration of physical properties of stabilization systems: rubber particulate de-tackifies sticky wastes for easier handling, treatment and disposal; for example, pretreats tars and heavy organics prior to incineration or use as a fuel.

Rice Hull Ash

The rice hull ash having utility in this invention is obtained by burning rice hulls as fuel in the generation of energy, or for disposal of the hulls. The resultant ash is composed primarily of amorphous silica, with small amount of carbon and other impurities. Suitable biogenetic amorphous silica for use in the present process include ash from rice stalks, equisetum (horse tail weed), bagasse, and certain bamboo palm leaves, particularly palmyra pollen and the like. Rice hull ash and the ash of the other materials used as biogeneric amorphous silica in the process of the present invention is a fine powder that needs no further processing prior to its application.

Test Data

Rubber particulate and/or rice hull ash, either alone or in combination with conventional S/S agents (cement, lime, flyash, lime kiln dust, cement kiln dust, silica, soluble silicates, gypsum, etc.), is used to immobilize organics in the waste, thereby preventing the organics from interfering with the chemical reactions of the S/S agents and limiting the leachability of the organic. When using either of these reagents alone or in combination with each other, the preferable ratio of addition is from about 0.01% to 150% by weight to weight of waste being treated.

The examples given below illustrate the present invention.

Analysis (TCA) test previously described. The results were expressed as mg/kg of constituent found in the TCA test before and after treatment, and as percent reduction in the constituent as a result of the treatment. Also shown in Table III are EPA Universal Treatment Standards (UTS) where such standards exist. It is evident that rubber particulate reduced the measured constituents to acceptable values - values in compliance with the EPA Universal Treatment Standard requirements. Also, percent reductions ranged from about 85% to 99.9%, which would generally meet the remedial requirements under CERCLA and RCRA. Percent reduction is calculated by the following formula, which takes into account any dilution caused by the reagents and other additives such as water.

TABLE III

Immobilization of Organic Constituents Using Rubber Particulate - Semi-Volatile Organics

| Compound | EPA Hazardous Waste Code | Universal Treatment Standard (mg/kg) | TCA Before Treatment (mg/kg) | TCA After Treatment (mg/kg) | % Reduction |
| --- | --- | --- | --- | --- | --- |
| Bis(2-Ethylhexyl) Phthalate | | 28. | 150 | <0.99 | 99.0 |
| Cresol | D023-6 | 3.2 | <9.9 | <0.99 | 85.0 |
| 1,2-Dichlorobenzene | | 6.0 | 160. | 5.64 | 94.7 |
| 1,4-Dichlorobenzene | D027 | 6.0 | 147. | 6.03 | 93.8 |
| 2,4-Dinitrotoluene | D030 | 140. | 226 | <0.99 | 99.3 |
| Hexachlorobenzene | D032 | 10. | 143. | 6.96 | 92.6 |
| Hexachloroethane | D034 | 30. | 114. | 6.45 | 91.5 |
| Lindane (gamma-BHC) | D013 | 0.066 | 124. | <5.0 | 94.0 |
| Methoxychlor | D014 | 0.18 | 59.5 | <5.0 | 87.4 |
| Nitrobenzene | D036 | 14. | 166. | 3.66 | 96.7 |
| Pentachlorophenol | D037 | 7.4 | 233. | 0.60 | 99.6 |
| Pyridine | D038 | 16. | 1900. | <0.99 | 99.9 |
| 2,4,5-Trichlorophenol | D041 | 7.4 | 200. | <4.8 | 96.4 |
| 2,4,6-Trichlorophenol | D043 | 7.4 | 178. | <0.99 | 99.1 |
| Phthalic Anhydride (As Acid) | | 28. | <30. | <3.0 | 85.0 |

$$\text{Percent Reduction} = \left[ 1 - (1 + \text{Additives Ratio}) \times \frac{C_t}{C_r} \right] \times 100$$

where:

$C_t$=Concentration of Treated Waste $C_r$=Concentration of Raw Waste

Additives ratio is the mass of additives, including water, divided by the mass of the raw waste Example 2

Soil contaminated with the mixture of VOC constituents shown in Table IV was treated with a combination of Portland cement and rubber particulate at the ratios of 20% by weight Portland cement and 10% by weight rubber particulate ("KAX") and sufficient water to form a paste. The resulting mixture was allowed to cure in a closed container for seven days, and then was tested by the Total Constituent Analysis (TCA) test previously described. The results, shown in Table IV, were expressed as mg/kg of constituent found in the TCA test before and after treatment, and as percent reduction in the constituent as a result of the treatment. Also shown in Table IV are EPA Universal Treatment Standards (UTS) where such standards exist. In this example, it is evident that rubber particulate was not effective in immobilizing volatile organic compounds. For

EXAMPLES

Example 1

Soil contaminated with a mixture of SVOC constituents shown in Table III was treated with a combination of Portland cement and rubber particulate ("KAX") at the ratios of 20% by weight Portland cement and 10% by weight rubber particulate and sufficient water to form a paste The resulting mixture was allowed to cure in a closed container for seven days, and then was tested by the Total Constituent most compounds, there was no significant reduction in TCA after treatment, and only two constituents exhibited % reductions of greater than about 50%.

TABLE IV

Immobilization of Organic Constituents Using Rubber Particulate - Volatile Organics

| Compound | EPA Hazardous Waste Code | Universal Treatment Standard (mg/kg) | TCA Before Treatment (mg/kg) | TCA After Treatment (mg/kg) | % Reduction |
|---|---|---|---|---|---|
| Benzene | D018 | 10. | 200. | <10. | 92.5 |
| 2-Butanone | D035 | 36. | 640. | <50 | 88.2 |
| Carbon Disulfide | | 4.81 | 640. | <200. | 53.1 |
| 1,2-Dichloroethane | D028 | 6.0 | 270. | <100. | 44.4 |
| Methanol | | 0.75 | 1219. | 444. | 45.3 |

Example 3

Soil contaminated with a mixture of SVOC constituents shown in Table V was treated with a combination of Portland cement and rice hull ash at the ratios of 20% by weight Portland cement and 10% by weight rice hull ash and sufficient water to form a paste. The resulting mixture was allowed to cure in a closed container for seven days, and then was tested by the Total Constituent Analysis (TCA) test previously described. The results, shown in Table V were expressed as mg/kg of constituent found in the TCA test before and after treatment, and as percent reduction in the constituent as a result of the treatment. Also shown in Table V are EPA Universal Treatment Standards (UTS) where such standards exist. It is evident by this example that rice hull ash was not effective in immobilizing semi-volatile organic compounds. For most compounds, there was no significant reduction in TCA after treatment, and only two constituents exhibited % reductions of greater that would be considered good in treatment of organic hazardous wastes.

weight Portland cement and 10% by weight rice hull ash and sufficient water to form a paste. The resulting mixture was allowed to cure in a closed container for seven days, and then was tested by the Total Constituent Analysis (TCA) test previously described. The results, shown in Table VI, were expressed as mg/kg of constituent found in the TCA test before and after treatment, and as percent reduction in the constituent as a result of the treatment. Also shown in Table VI are EPA Universal Treatment Standards (UTS) where such standards exist. It is evident that, in this case, rice hull ash reduced the measured constituents to acceptable values, most of which were in compliance with the EPA Universal Treatment Standard requirements. Percent reductions ranged from about 85% to 99.9%, which would generally meet the remedial requirements under CERCLA and RCRA. Percent reduction is calculated by the following formula, which takes into account any dilution caused by the reagents and other additives such as water.

TABLE V

Immobilization of Organic Constituents Using Rice Hull Ash - Semi-Volatile Organics

| Compound | EPA Hazardous Waste Code | Universal Treatment Standard (mg/kg) | TCA Before Treatment (mg/kg) | TCA After Treatment (mg/kg) | % Reduction |
|---|---|---|---|---|---|
| 2,4-Dinitrotoluene | D030 | 140. | 438. | 67. | 77.1 |
| Pentachlorophenol | D037 | 7.4 | 152. | <1.8 | 98.2 |
| Pyridine | D038 | 16. | 1900. | 554. | 56.3 |
| 2,4,6-Trichlorophenol | D043 | 7.4 | 952. | 6.24 | 99.0 |

Example 4

Soil contaminated with a mixture of VOC constituents shown in Table VI was treated with a combination of Portland cement and rice hull ash at the ratios of 20% by

TABLE VI

Immobilization of Organic Constituents Using Rice Hull Ash - Volatile Organics

| Compound | EPA Hazardous Waste Code | Universal Treatment Standard (mg/kg) | TCA Before Treatment (mg/kg) | TCA After Treatment (mg/kg) | % Reduction |
|---|---|---|---|---|---|
| Benzene | D018 | 10. | 418. | 26.4 | 90.5 |
| N-Butanol | | 2.6 | 3350. | <5.0 | 99.8 |
| Carbon Disulfide | | 4.81 | 83. | <0.25 | 99.6 |
| Chloroform | D022 | 6.0 | 431. | 9.8 | 96.6 |
| Cyclohexanone | | 0.75 | 536. | <5.0 | 98.6 |
| 1,2-Dichloroethane | D028 | 6.0 | 654. | <0.25 | 99.9 |
| Ethyl Acetate | | 33. | 258. | <0.25 | 99.9 |

TABLE VI-continued

| | Immobilization of Organic Constituents Using Rice Hull Ash - Volatile Organics | | | | |
|---|---|---|---|---|---|
| Compound | EPA Hazardous Waste Code | Universal Treatment Standard (mg/kg) | TCA Before Treatment (mg/kg) | TCA After Treatment (mg/kg) | % Reduction |
| Iso-Butyl Alcohol | | 170. | 2100. | <5.0 | 99.6 |
| Methylene Chloride | | 30. | 62. | <0.25 | 99.4 |
| 1,1,1-Trichloroethane | | 6.0 | 550. | <0.25 | 99.9 |
| Trichloroethylene | D040 | 6.0 | 881. | 89.1 | 84.8 |
| 1,1,2-Trichloro-1,2,2-Trifluoroethane | | 30. | 9.1 | <0.25 | 95.9 |

Example 5

Soil contaminated with a mixture of VOC and SVOC constituents (separated by a double line in the table) shown in Table VII is treated with a combination of Portland cement, rubber particulate ("KAX"), and rice hull ash at the ratios of 20%, 10% and 10%. respectively by weight, along with sufficient water to form a paste. The resulting mixture is allowed to cure in a closed container for seven days, and then is tested by the Total Constituent Analysis (TCA) test previously described. The results, shown in Table VI, are expressed as mg/kg of constituent found in the TCA test before and after treatment, and as percent reduction in the constituent as a result of the treatment. Also shown in Table VII are EPA Universal Treatment Standards (UTS) where such standards exist. It is evident that, in this case, the mixture of rubber particulate and rice hull ash reduces the measured constituents to acceptable values, most of which were in compliance with the EPA Universal Treatment Standard requirements. Percent reductions are achieved that range from about 85% to 99.9%, which would generally meet the remedial requirements under CERCLA and RCRA.

Example 6

Soil contaminated with a mixture of VOC and SVOC constituents shown in Table VIII is treated with a combination of Portland cement and activated carbon at the ratios of 20% and 10%, respectively by weight, along with sufficient water to form a paste. The resulting mixture is allowed to cure in a closed container for seven days, and then is tested by the Total Constituent Analysis (TCA) test previously described. The results, shown in Table VI, are expressed as mg/kg of constituent found in the TCA test before and after treatment, and as percent reduction in the constituent as a result of the treatment. Also shown in Table VIII are EPA Universal Treatment Standards (UTS) where such standards exist. It is obvious from Table VIII that activated carbon is ineffective in reducing TCA values except in certain cases. The exceptions are instructive: carbon disulfide and ethyl acetate were reduced to below detection limits by all additives and reagents, including cement alone, probably by volatilization in the case of carbon disulfide and alkaline hydrolysis in the case of ethyl acetate. Cyclohexanone and the substituted phenols (pentachlorophenol, 2,4,5-trichlo-

TABLE VII

| | Immobilization of Organic Constituents Using A Mixture of Rubber Particulate and Rice Hull Ash | | | | |
|---|---|---|---|---|---|
| Compound | EPA Hazardous Waste Code | Universal Treatment Standard (mg/kg) | TCA Before Treatment (mg/kg) | TCA After Treatment (mg/kg) | % Reduction |
| Benzene | D018 | 10. | 418. | <30. | 89 |
| N-Butanol | | 2.6 | 3350. | <5.0 | 100 |
| Carbon Disulfide | | 4.81 | 83. | <0.25 | 100 |
| Chloroform | D022 | 6.0 | 431. | <10. | 97 |
| Cyclohexanone | | 0.75 | 536. | <5.0 | 99 |
| 1,2-Dichloroethane | D028 | 6.0 | 654. | <0.25 | 100 |
| Ethyl Acetate | | 33. | 258. | <0.25 | 100 |
| Iso-Butyl Alcohol | | 170. | 2100. | <5.0 | 100 |
| Methylene Chloride | | 30. | 62. | <0.25 | 99 |
| 1,1,1-Trichloroethane | | 6.0 | 550. | <0.25 | 100 |
| Trichloroethylene | D040 | 6.0 | 881. | <100. | 83 |
| 1,1,2-Trichloro-1,2,2-Trifluoroethane | | 30. | 9.1 | <0.25 | 96 |
| Bis(2-Ethylhexyl) Phthalate | | 28. | 150 | <1.0 | 99 |
| Cresol | D023-6 | 3.2 | <9.9 | <1.0 | 85 |
| 1,2-Dichlorobenzene | | 6.0 | 160. | <10. | 91 |
| 1,4-Dichlorobenzene | D027 | 6.0 | 147. | <10. | 90 |
| 2,4-Dinitrotoluene | D030 | 140. | 226 | <1.0 | 99 |
| Hexachlorobenzene | D032 | 10. | 143. | <10. | 90 |
| Hexachloroethane | D034 | 30. | 114. | <10. | 87 |
| Lindane (gamma-BHC) | D013 | 0.066 | 124. | <5.0 | 94. |
| Methoxychlor | D014 | 0.18 | 59.5 | <5.0 | 87. |
| Nitrobenzene | D036 | 14. | 166. | <5.0 | 95 |
| Pentachlorophenol | D037 | 7.4 | 233. | <1.0 | 99 |
| Pyridine | D038 | 16. | 1900. | <1.0 | 100 |
| 2,4,5-Trichlorophenol | D041 | 7.4 | 200. | <5.0 | 96 |
| 2,4,6-Trichlorophenol | D043 | 7.4 | 178. | <1.0 | 99 |
| Phthalic Anhydride (As Acid) | | 28. | <30. | <5.0 | 75 | rophenol and 2,4,6-trichlorophenol) may be strongly sorbed by a variety of reagents. All other constituents are not substantially reduced in TCA value by treatment with activated carbon. The negative values for TCA reduction reflect analytical variability in the TCA method, which is also why low % reduction numbers, i.e., below about 50%, are not meaningful.

The other important result of this test is that VOCs are not necessarily volatilized in stabilization processing, contrary to common belief and the general position of EPA on this subject. Since all of the testing was deliberately conducted in exactly the same way at the same time for all reagents, and since the different reagents were essentially the same with respect to any exothermic reactions that might have caused volatilization, it is evident from this example that the organic constituents (with the exceptions noted) did not volatilize during testing but were, in fact, immobilized by rubber particulate and rice hull ash. If this were not so, the volatile constituents would be absent or substantially reduced in any of the reagent systems, including activated carbon, but Table VIII shows that they are not.

In all of the above examples, the test results show that organic constituents in wastes can be immobilized successfully by the use of rubber particulate, rice hull ash, or both as reagents, either alone or in combination with other, conventional stabilization reagents. The present invention provides a method for immobilization of low levels of EPA-listed and regulated toxic organic constituents, both presently known and listed as well as those that may be listed in the future, and other undesirable organic compounds in a matrix that is superior in this respect to stabilization matrices previously known and used.

Advantages of the present invention should be apparent. In addition to providing excellent immobilization of most organic constituents, the reagents, rubber particulate and rice hull ash, are readily available and relatively inexpensive. Both are derived from waste materials, and are available commercially from a variety of distribution points at prices lower than activated carbon, a reference material commonly used in waste treatment. Furthermore, rubber particulate has been demonstrated to reduce the volatility of VOCs, thereby minimizing air pollution during the processing step as well as afterwards during curing, handling and disposal operations. In some cases, this may eliminate the requirement for expensive and cumbersome air pollution control equipment on and around the processing and disposal units. This latter property also provides an extra margin of safety when handling wastes that contain flammable organic compounds.

From the above description of the invention, those skilled in the art will perceive improvements, changes ;and modifications. Such improvements, changes and modifications, within the skill of the art, are intended to be covered by the appended claims.

TABLE VIII

Immobilization of Organic Constituents Using Activated Carbon

| Compound | EPA Hazardous Waste Code | Universal Treatment Standard (mg/kg) | TCA Before Treatment (mg/kg) | TCA After Treatment (mg/kg) | % Reduction |
|---|---|---|---|---|---|
| Benzene | D018 | 10. | 418. | 197. | 29 |
| N-Butanol | | 2.6 | 3350. | 1810. | 19 |
| Carbon Disulfide | | 4.81 | 83. | 3.89 | 93 |
| Chloroform | D022 | 6.0 | 431. | 308. | −7 |
| Cyclohexanone | | 0.75 | 536. | 16.2 | 95 |
| 1,2-Dichloroethane | D028 | 6.0 | 654. | 437. | −0 |
| Ethyl Acetate | | 33. | 258. | <0.25 | 100 |
| Iso-Butyl Alcohol | | 170. | 2100. | 1210. | 14 |
| Methylene Chloride | | 30. | 62. | 37.2 | 10 |
| 1,1,1-Trichloroethane | | 6.0 | 550. | 308. | 16 |
| Trichloroethylene | D040 | 6.0 | 881. | 471. | 20 |
| 1,1,2-Trichloro-1,2,2-Trifluoroethane | | 30. | 9.1 | 12.9 | −113 |
| Bis(2-Ethylhexyl) Phthalate | | 28. | 776. | 396. | 23 |
| 1,2-Dichlorobenzene | | 6.0 | 429. | 346. | −21 |
| 1,4-Dichlorobenzene | D027 | 6.0 | 461. | 337. | −10 |
| 2,4-Dinitrotoluene | D030 | 140. | 438. | 213. | 27 |
| Hexachlorobenzene | D032 | 10. | 440. | 406. | −38 |
| Hexachloroethane | D034 | 30. | 381. | 351. | −38 |
| Nitrobenzene | D036 | 14. | 372. | 302. | −22 |
| Pentachlorophenol | D037 | 7.4 | 152. | <1.8 | 98 |
| Pyridine | D038 | 16. | 1900. | 733. | 42 |
| 2,4,5-Trichlorophenol | D041 | 7.4 | 132. | 3.37 | 96 |
| 2,4,6-Trichlorophenol | D043 | 7.4 | 952. | 1.88 | 100 |

The method of the present invention is particularly applicable to the "Regulated Hazardout Organic Constituent" list appearing in the Table 1 "Universal Treatment Standards for Regulated Hazardous Constituents" from the EPA Fact Sheets, August 1994, Summery of UTS, in accordance with the EPA classifications set forth in reference 8 below which is hereby incorporated into this disclosure by reference. In addition to the EPA lists described above, these organics can be categorized by functional descriptions and EPA treatability groups. These are the following:

| EPA TREATABILITY GROUPS | FUNCTIONAL GROUPINGS |
|---|---|
| Aromatic Hydrocarbons | Acids |
| Chlorobenenes | Aliphatic Alcohols |
| Chlorinated Pesticides | Aromatic Alcohols |
| Chlorinated Phenolics and Derivatives | Aldehydes |
| Chlorinated Volatiles | Amines |
| Nonchlorinated Phenolics | Aromatics |
| Organo-Bromines | Cyclic |
| Oxygenated Hydrocarbons | Chlorinated Aliphatics |
| Organo-Nitrogen Compounds | Chlorinated Aromatics |
| Organo-Sulfur Pesticides | Dioxins and Furans |

-continued

| EPA TREATABILITY GROUPS | FUNCTIONAL GROUPINGS |
|---|---|
| PCBs and Dioxins | Esters |
| Phthalates | Ethers |
| Polynuclear Aromatic Hydrocarbons | Ketones |
| | Organo-Nitrogen Compounds |
| | Organo-Sulfur Compounds |
| | Pesticides |
| | Polynuclear Aromatic Hydrocarbons |
| | PCBs |

REFERENCES

1. U.S.EPA. *Cleaning up the nation's Waste Sites: markets and Technology Trends*. IPA 542-H-92-012, April 1993.
2. Conner, J. R. *Chemical Fixation and Solidification of Hazardous Wastes*. New York: Van Nostrand Reinhold, 1990.
3. *Conner, J. R. and P. R. Lear. Immobilization of Low-Level Organic Compounds in Hazardous Waste. Proc, Air and Waste Management* 84th Annual Meeting, Vancouver, B.C., 1991.
4. U.S. EPA. *Federal Register*, Vol. 55, No. 61, Mar. 29, 1990.
5. U.S. EPA. *Superfund LDR Guide #6B*, Superfund Publication: 9347.3-06BFS, September 1990.
6. U.S. EPA. *Engineering Bulletin: Solidification/stabilization or Inorganics and Organics (Draft)*, November. 1991.
7. *Federal Register*, 57, pp. 37194–37282, Aug. 8, 1992.
8. *U.S. EPA. Land Disposal Restrictions Phase II—Universal Treatment Standards, and Treatment Standards for Organic Toxicity Characteristics Waster and Newly Listed Wastes, Final Rule*, August, 1994.
9. *Federal Register*, 48(176), pp. 48092–48204, Sep. 14, 1993.
10. U.S.EPA, *Test Methods for Evaluating Solid Waste*, SW-846, 1980 and subsequent revisions and updates.
11. Conner, J. R. and F. G. Smith, "Immobilization of Low-Level Hazardous Organics Using Recycled Materials," *Third Intervational Symposium on Stabilization/solidification of hazardous, radioactive, and Mixed Wastes, Williamsburg, Va. Nov.* 1–5, 1993.
12. M. Tittlebaum, F. Cartledge and H. Eaton, *Applicability of Solidification to Organic Wastes*, Louisiana State Univ., Baton Rouge, La. 1987.

What is claimed is:

1. A process for immobilizing one or more hazardous organic substances contained in or on solid particulate materials or debris comprising contacting said materials or debris with at least one stabilizing agent said hazardous organic substances include volatile organic substances and said stabilizing agent includes biogenic amorphous silica.

2. The method of claim 1 wherein said hazardous organic substances includes semi-volatile materials and said stabilizing agent includes particulate rubber.

3. The method of claim 2 wherein said particulate rubber is present within a particle size range of from about ¼ cubic inch to 200 mesh.

4. The method of claim 2 wherein about 40% of said particulate rubber will pass through a 50 mesh screen.

5. The method of claim 1 wherein said solid particulate material is soil.

6. The method of claim 1 wherein said solid material is debris.

7. The method of claim 1 wherein said agent includes one or more additional materials selected from the group of cementitious material and activated carbon.

8. The method of claim 1 wherein said agent is added in the amount of from about 0.01% to 150%, by weight, of the hazardous material being treated.

* * * * *